(12) United States Patent
Ranbro

(10) Patent No.: US 8,922,674 B2
(45) Date of Patent: Dec. 30, 2014

(54) METHOD AND SYSTEM FOR FACILITATING COLOR BALANCE SYNCHRONIZATION BETWEEN A PLURALITY OF VIDEO CAMERAS AND FOR OBTAINING OBJECT TRACKING BETWEEN TWO OR MORE VIDEO CAMERAS

(75) Inventor: Mikael Ranbro, Eslov (SE)

(73) Assignee: Axis AB, Lund (SE)

(*) Notice: Subject to any disclaimer, the term of this patent is extended or adjusted under 35 U.S.C. 154(b) by 162 days.

(21) Appl. No.: 13/552,400

(22) Filed: Jul. 18, 2012

(65) Prior Publication Data

US 2013/0021496 A1 Jan. 24, 2013

Related U.S. Application Data

(60) Provisional application No. 61/509,831, filed on Jul. 20, 2011.

(30) Foreign Application Priority Data

Jul. 19, 2011 (EP) .................................. 11174494

(51) Int. Cl.
*H04N 9/73* (2006.01)
*G06T 7/40* (2006.01)

(52) U.S. Cl.
CPC ............... *H04N 9/735* (2013.01); *G06T 7/408* (2013.01); *G06T 2207/10016* (2013.01); *G06T 2207/10024* (2013.01)
USPC ..................................................... 348/223.1

(58) Field of Classification Search
CPC ... H04N 5/23203; H04N 7/181; H04N 9/045; H04N 9/735; G06T 7/408; G06T 2207/10024; G06T 2207/10016

USPC ........ 348/211.3, 211.11, 223.1, 225.1, 231.6; 382/103, 164, 165, 168, 276, 312
See application file for complete search history.

(56) References Cited

U.S. PATENT DOCUMENTS

| 4,626,893 | A  | * | 12/1986 | Yamanaka ..................... 348/176 |
| 6,256,062 | B1 | * | 7/2001  | Endo ........................... 348/223.1 |
| 6,947,078 | B1 | * | 9/2005  | Kuwata et al. ............. 348/223.1 |
| 7,099,510 | B2 |   | 8/2006  | Jones et al. |
| 7,110,597 | B2 | * | 9/2006  | Goldsmith ..................... 382/167 |

(Continued)

FOREIGN PATENT DOCUMENTS

| CN | 101047867 A | 10/2007 |
| EP | 1862941 A2 | 2/2007 |

(Continued)

OTHER PUBLICATIONS

Stauffer et al., "Adaptive background mixture models for real-time tracking," Proceedings of the IEEE Conference on Computer Vision and Pattern Recognition (CVPR), p. 246-252, 1999.

(Continued)

*Primary Examiner* — Lin Ye
*Assistant Examiner* — Chriss Yoder, III
(74) *Attorney, Agent, or Firm* — Volpe and Koenig, P.C.

(57) ABSTRACT

A method for facilitating color balance synchronization between a plurality of video cameras within a system of video cameras includes detecting an object in a video sequence captured by a video camera in the system, determining an object color histogram for the detected object, updating a camera specific reference color histogram using the determined object color histogram, and determining one or more camera specific color histogram compensation coefficients by comparing the camera specific reference color histogram with a system reference color histogram. A system for facilitating color balance synchronization between a plurality of video cameras includes a video camera being connectable to a network of video cameras.

14 Claims, 10 Drawing Sheets

(56) References Cited

U.S. PATENT DOCUMENTS

| | | | |
|---|---|---|---|
| 7,450,735 | B1 | 11/2008 | Shah et al. |
| 8,018,494 | B2 * | 9/2011 | Yokomitsu et al. ...... 348/208.14 |
| 8,493,467 | B2 * | 7/2013 | Nagamasa et al. ......... 348/223.1 |
| 2005/0141762 | A1 | 6/2005 | Zhao et al. |
| 2007/0154088 | A1 | 7/2007 | Goh et al. |
| 2007/0211938 | A1 | 9/2007 | Tu et al. |
| 2008/0031493 | A1 * | 2/2008 | Brogren et al. ............... 382/103 |
| 2010/0080477 | A1 | 4/2010 | Almbladh |

FOREIGN PATENT DOCUMENTS

| | | | |
|---|---|---|---|
| EP | 1862941 | A2 | 12/2007 |
| EP | 1973074 | A1 | 9/2008 |

OTHER PUBLICATIONS

Schneiderman et al., "A Statistical Method for 3D Object Detection Applied to Faces and Cars," at Robotics Institute, Carnegie Mellon University, Pittsburgh, PA 15213. (2000).

Piccardi, Massimo et al. "Track Matching Over Disjoint Camera Views Based on an Incremental Major Color Spectrum Histogram" Faculty of Information Technology, University of Technology, Sydney (UTS), Australia IEEE 2005, pp. 147-152.

Mazzeo, Pier Luigi et al. "Object Tracking in Multiple Cameras with Disjoint Views" Istituto sui Sistemi Intelligenti per l'automazione (CNR), Italy Feb. 28, 2011, pp. 209-228.

Cheng, Eric Dahai et al. "Matching of Objects Moving Across Disjoint Cameras" Faculty of Information Technology, University of Technology, Sydney (UTS), Australia IEEE 2006, pp. 1769-1772.

Jeong, Kideog Abstract of Thesis—"Object Matching in Disjoint Cameras Using a Color Transfer Approach" Nov. 27, 2006 (47 pages).

Flores, Elias Poster—"Tracking Objects Across spatially separated cameras with non overlapping field of views" Vision Research Lab, Electrical and Computer Engineering Dept, UCSB Aug. 12, 2009 (1 page).

* cited by examiner

METHOD AND SYSTEM FOR FACILITATING COLOR BALANCE SYNCHRONIZATION BETWEEN A PLURALITY OF VIDEO CAMERAS AND FOR OBTAINING OBJECT TRACKING BETWEEN TWO OR MORE VIDEO CAMERAS

CROSS REFERENCE TO RELATED APPLICATIONS

This application claims priority to European Patent Application No. EP11174494.2 filed on Jul. 19, 2011, and claims the benefit of U.S. Provisional Application No. 61/509,831 filed on Jul. 20, 2011, which are incorporated by reference as if fully set forth.

FIELD OF INVENTION

The present invention relates to a method for facilitating color balance synchronization between a plurality of video cameras within a system of video cameras. The present invention also relates to a system for facilitating color balance synchronization between a plurality of video cameras. Moreover the present invention relates to a video camera being arranged to monitor an area and being connectable to a system of video cameras for facilitating color balance synchronization between a plurality of video cameras. Furthermore, the present invention relates to a method and system for obtaining object tracking between two or more video cameras.

BACKGROUND

The use of video cameras is well known in the field of monitoring systems. In a typical monitoring system one or more video cameras are placed to provide a field of view of the area under monitoring. These video cameras convert a visual image into electronic form suitable for transmission, recording or analysis. A challenging problem using a network of video cameras is that the appearance, especially the color, of an object in one video camera view might be different from its appearance in another video camera view due to the differences in illumination and video camera settings/properties.

It has been found that one of the most promising features for identifying properties of an object and for tracking an object between two different video sequences, the tracking being based on identified properties of an object to track and identified properties of a candidate object, is color. Using color histogram of objects as feature ought to be insensitive to variations such as change in shape, smaller partial occlusions, change in orientation and a shift in viewing position. On the other hand color histogram features are sensitive to changes in the color and intensity of the illumination. However, according to the above presented problem it is difficult to compare color histograms of the same object captured by means of different video cameras.

Consequently, there is a need for a method and a system for facilitating color balance synchronization between a plurality of video cameras within a system of video cameras.

SUMMARY

In view of the above, the invention relates to facilitating color balance synchronization between a plurality of video cameras within a system of video cameras.

The invention also relates to providing for tracking of an object between two or more video cameras.

In particular, according to a first embodiment, a method for facilitating color balance synchronization between a plurality of video cameras within a system of video cameras is presented. The method comprises detecting an object in a video sequence captured by a video camera in the system, determining an object color histogram for the detected object, updating a camera specific reference color histogram using the determined object color histogram, and determining one or more camera specific color histogram compensation coefficients by comparing the camera specific reference color histogram with a system reference color histogram.

According to this, a method for facilitating color balance synchronization between a plurality of video cameras within a system of video cameras is achieved. By determining the relative color balance of the cameras included in the system, comparative image analysis can be performed on images from cameras experiencing differing lighting conditions. This may for example be used in order to reliably track people and/or objects over a large area using many cameras without the need of constant recalibration when conditions change.

According to one embodiment, the method further comprises determining an object type, such as a car, an animal or a human, of the detected object, wherein each object type has a specific camera specific reference color histogram and wherein each object type has a specific system reference color histogram. By using different camera specific reference histograms and system reference color histograms for different types of objects the statistical variation of colors for objects of a specific type is accounted for. For example persons may have another statistical distribution of colors than cars.

According to another embodiment, the method further comprises translating the object color histogram into a camera independent object color histogram using the camera specific color histogram compensation coefficients. The camera independent object color histogram may also be seen as a global reference histogram for a specific object. The global reference histogram for the specific object may then be used in order to track an object across the whole system of cameras. The object tracking of an object across the whole system may be achieved according to the following: detecting an object to track in a first video sequence captured by a first video camera; determining an object color histogram for the detected object to track; translating the object color histogram for the object to track into a camera independent object color histogram using the camera specific color histogram compensation coefficients; detecting a candidate object in a second video sequence captured by a second video camera; determining an object color histogram for the candidate object; translating the object color histogram for the candidate object into a camera independent object color histogram using the camera specific color histogram compensation coefficients; matching the camera independent object color histogram of the candidate object with the camera independent object color histogram of the object to track; calculating, based on the matching step, the likelihood of the candidate object being identical to the object to track; and generating a signal indicating the likelihood of the candidate object being identical to the object to track.

According to yet another embodiment of the method, the system reference color histogram is based on a camera specific reference color histogram of a specific video camera. By doing so, a specific camera is chosen to be the master camera.

According to a further embodiment of the method, the system reference color histogram is based on a combination of at least two camera specific reference color histograms.

According to another embodiment of the method, the camera specific reference color histogram and the system reference color histogram are dependent upon an external factor, such as the time of the day or if a store is opened or closed. Accordingly, different statistical distributions of colors of the objects at different conditions may be accounted for.

According to yet another embodiment of the method, the color histogram is to be interpreted as a color histogram of any type of color space, such as a YCbCr color histogram, a YCb color histogram combined with a YCr color histogram, a RGB color histogram, a CMYK color histogram, a grey scale histogram, an intensity histogram and/or an IR histogram.

According to another embodiment, a system for facilitating color balance synchronization between a plurality of video cameras is presented. The system comprises a video camera, an object detection unit being arranged to detect an object in a video sequence captured by the video camera, a first memory for storing a camera specific reference color histogram, a second memory for storing a system reference color histogram, an object color histogram producer being arranged to determine an object color histogram for the object detected by the object detection unit, a color histogram updater for updating, using the object color histogram determined by the color histogram producer, a camera specific reference color histogram stored in the first memory, and a compensation coefficient producer for determining one or more camera specific color histogram compensation coefficients using the camera specific reference color histogram and a system reference color histogram stored in the second memory.

The video camera of the system may be a thermal camera detecting infrared wavelengths, a camera detecting visible or infrared light and/or a camera for monitoring applications such as surveillance purposes, machine vision, store compliance, business information, etc.

According to one embodiment, the system further comprises a first video camera being arranged to monitor a first area and a second video camera being arranged to monitor a second area, wherein the first and second areas do not overlap.

According to another embodiment, the system further comprises an object type determination unit being arranged to determine the object type, such as a car, an animal or a human, of the detected object, wherein each object type has a specific camera specific reference color histogram and wherein each object type has a specific system reference color histogram.

According to yet another embodiment, the system further comprises an object attribute identification apparatus being arranged for identifying attributes of the object using the color histogram for the detected object and the camera specific color histogram compensation coefficients.

According to another embodiment, a video camera being connectable to a network of video cameras for facilitating color balance synchronization between a plurality of video cameras is presented. The video camera comprises a first memory for storing a camera specific reference color histogram, a second memory for storing a system reference color histogram, an object detection unit being arranged to detect an object in a video sequence captured by the video camera, an object color histogram producer being arranged to determine an object color histogram for the object detected by the object detection unit, a color histogram updater for updating, using the object color histogram determined by the object color histogram producer, a camera specific reference color histogram stored in the first memory, a compensation coefficient producer for determining a camera specific color histogram compensation coefficient using the camera specific reference color histogram and a system reference color histogram stored in the second memory.

The video camera may be a thermal camera detecting infrared wavelengths, a camera detecting visible or infrared light and/or a camera for monitoring applications such as surveillance purposes, machine vision, store compliance, business information, etc.

According to one embodiment, the video camera further comprises an object type determination unit being arranged to determine the object type, such as a car, an animal or a human, of the detected object, wherein each object type has a specific camera specific reference color histogram and wherein each object type has a specific system reference color histogram.

According to another embodiment, the video camera comprises an object attribute identification apparatus being arranged for identifying attributes of the object using the color histogram for the detected object and the camera specific color histogram compensation coefficients.

According to another embodiment, a computer-readable recording medium is presented. The computer-readable recording medium has recorded thereon a program for implementing the method according to any of the embodiments presented above when executed on a device having processing capabilities.

BRIEF DESCRIPTION OF THE DRAWINGS

These and other aspects of the present invention will now be described in more detail, with reference to appended drawings showing embodiments of the invention. The figures should not be considered limiting the invention to the specific embodiment; instead they are used for explaining and understanding the invention. Like numbers refer to like elements throughout the figures.

DETAILED DESCRIPTION

Figure 1A:
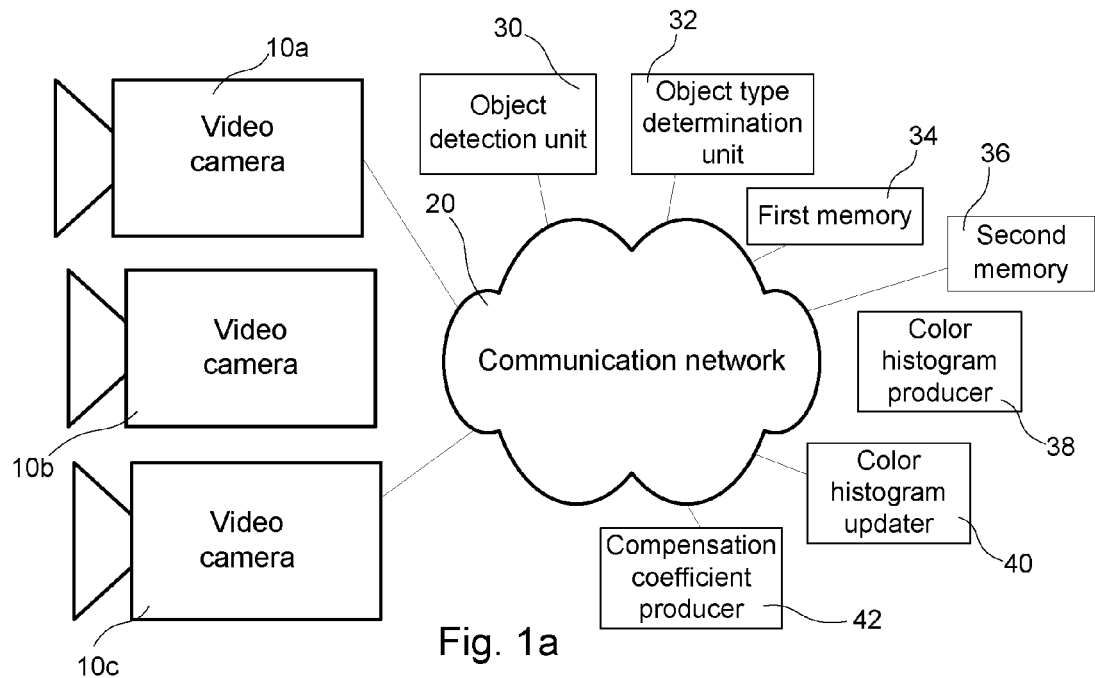
FIG. 1a schematically illustrates a system for facilitating color balance synchronization between a plurality of video cameras according to an embodiment.

This invention is directed towards synchronizing color balance between video cameras by using image analytics. This is feasible under the assumption that a large enough population of a certain type of object is travelling in view of each video camera of a system of video cameras. Each video camera should see approximately the same statistical variation of colors in the objects. A relative color balance between the video cameras can then be determined, and updated over time to compensate for varying light conditions of the monitored scene.

The type or types of object that is to be used for the color balance synchronization may be defined for the system; it could for example be cars or persons. The system could also be configured to assume that everything that moves may be regarded as an object to detect. When an object according to the predetermined definition occurs in a video camera's view, the object is detected and the color histogram of the object is determined according to methods known in the art. Some of these methods will be discussed in more or less detail below.

A camera specific reference color histogram for a specific video camera is determined by detecting a number of objects and combining color histograms for the detected objects with each other in order to form the camera specific reference color histogram. Hence, the camera specific reference color histogram is based on the histograms of the objects processed by a specific video camera. The camera specific reference color histogram is normally updated for each new detected object. The camera specific reference color histogram will thus be typical for a specific video camera's video camera settings/properties and/or lighting conditions of the monitored scene.

According to one embodiment, the camera specific reference color histogram is also object type specific. Hence, every specific video camera may have a number of camera specific reference color histograms adapted for specific object types.

According to another embodiment, the camera specific reference color histogram is dependent upon an external factor, such as the time of the day. For example, a first camera specific reference color histogram may be used during daytime, a second camera specific reference color histogram may be used during nighttime, and a third camera specific reference color histogram may be used during dusk and dawn. According to another example a first camera specific reference color histogram may be used during opening hours for a store or supermarket and a second camera specific reference color histogram may be used during closing hours of the store or supermarket. According to yet another example, a first camera specific reference color histogram may be used during operation of a factory production line and a second camera specific reference color histogram may be used when the factory production line is not in operation.

In order to facilitate color balance synchronization between video cameras in a video camera system the camera specific reference color histogram is compared to a system reference color histogram. By doing so, one or more color histogram compensation coefficients may be deduced. The deduction of one or more color histogram compensation coefficients is made according to methods known by the skilled person. Some of these methods will be discussed in more detail below. The system reference color histogram is a global color reference for the whole system. The system reference color histogram may be generated by a master video camera, i.e., one of the video cameras in the system of video cameras. Alternatively, the system reference color histogram may be generated by using input from a number of video cameras in the system.

By determining the relative color balance of the video cameras included in the system of video cameras, comparative image analysis can be performed on images from video cameras experiencing different lighting conditions of the scene monitored by the video camera and/or having different video camera settings/properties.

By determining different camera specific reference color histograms and system reference color histogram for different types of objects, the statistical variation of colors for a specific type of object is accounted for. This is for example advantageous in an application of tracking an object between different video cameras. This because it is made possible to track different types of objects concurrently without letting color histograms from different object types interfere.

For some monitoring implementations, it is actually desirable to use a system of video cameras wherein each video camera of the system of video cameras is having different video camera settings/properties. Such an implementation is, for example, video cameras of a system of video cameras being arranged in areas having different lighting conditions, e.g. a video camera mounted outdoors has most often different video camera settings/properties as compared to a video camera mounted indoors. Another example is video cameras arranged for different tasks, e.g. a video camera being arranged to be optimized for face detection has most often different video camera settings/properties as compared to a video camera arranged for area overview.

According to one implementation, the one or more color histogram compensation coefficients may be used to transform a color histogram of a specific object captured by a specific video camera to a color histogram independent video camera settings/properties and/or lighting conditions of the monitored scene. Such an object color histogram being independent of video camera settings/properties and/or lighting conditions of the monitored scene can be used for object detection and object tracking across the whole system of video cameras. Thus, people and other types of objects can be tracked reliably over a large area using many video cameras without the need of constant recalibration when conditions change.

Figure 1B:
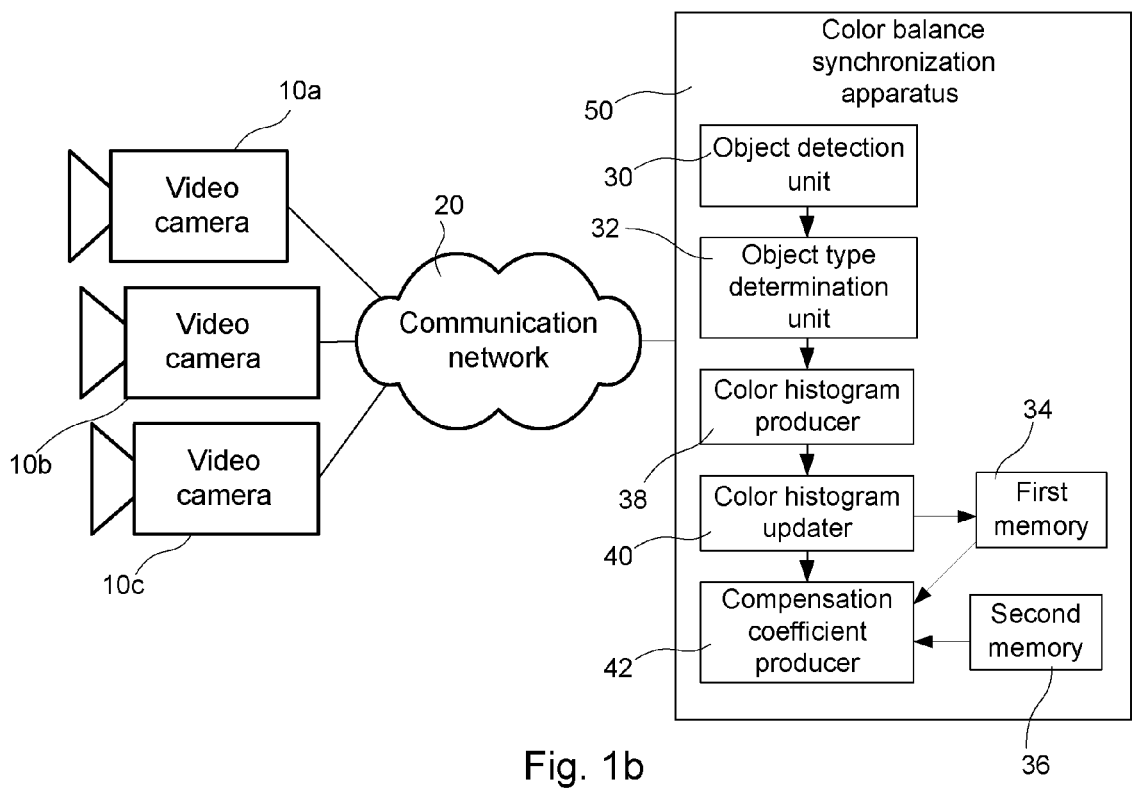
FIG. 1b schematically illustrates a system for facilitating color balance synchronization between a plurality of video cameras according to another embodiment.
Figure 1C:
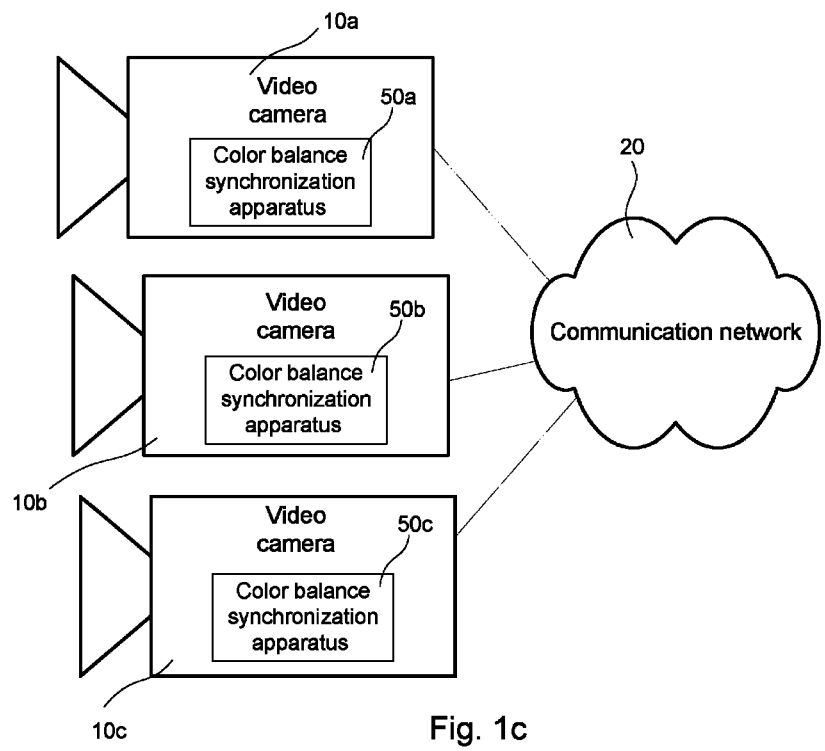
FIG. 1c schematically illustrates a system for facilitating color balance synchronization between a plurality of video cameras according to yet another embodiment.

FIGS. 1a, 1b and 1c illustrate systems for facilitating color balance synchronization between a plurality of video cameras according to the present invention. The systems comprise a number of video cameras 10a, 10b, 10c. The video cameras 10a, 10b, 10c are connected to each other via a communication network 20. In the systems illustrated in connection with this application three video cameras are connected to each other via the communication network 20. However, it is realized that any number of video cameras may be connected to each other via the communication network 20. The video cameras 10a, 10b, 10c may be any digital video cameras capable of generating image sequences and/or any analog video cameras capable of generating image sequences, in which case the analog video camera is connected to a converter transforming the analog image information to digital image data and providing the digital image data to the network 20. Such a converter might be a video encoder or a video server. The communication network 20 may be any kind of communication network for communicating digital image information, such as a wire line or wireless data communication network, e.g. a local area network (LAN) or a wireless local area network (W-LAN) or a Wide Area Network (WAN).

The system for facilitating color balance synchronization between a plurality of video cameras further comprises an object detection unit 30, an object type determination unit 32, a first memory 34, a second memory 36, an object color histogram producer 38, a color histogram updater 40, and a compensation coefficient producer 42.

The object detection unit 30 is arranged to detect an object in a video sequence captured by one of the video cameras 10a, 10*b*, 10*c*. The object can be detected in the object detection unit 30 either manually or automatically according to any known object detection technique. Examples of object detection techniques will be described below.

The object type determination unit 32 is arranged to determine the object type, such as a car, an animal or a human, of the detected object. Hence the object type determination unit 32 is arranged to categorize the detected objects into classes of object types. Object type determination techniques will be described in more detail below.

The object color histogram producer 38 is arranged for generating an object color histogram for the object detected by the object detection unit 30. The object color histogram is based on color and/or intensity information of the detected object. Usually this information originates from a plurality of images of the video sequence.

Herein, a color histogram means a histogram describing colors. That is, a color histogram shall be interpreted as a color histogram of any type of color space, such as an YCbCr color histogram, an YCb color histogram combined with an YCr color histogram, a RGB color histogram, a CMYK color histogram, a grey scale histogram, an intensity histogram and/or an IR histogram.

According to an embodiment, the color histograms are based upon the color and intensity of the pixels making up an object. Doing so each pixel could for example be represented in the YCbCr color space, where Y is the luma component and Cb and Cr are the blue-difference and red-difference chroma components. The histogram is created by dividing the color space into bins, and assigning each pixel to the bin according to the values of its color components.

The first memory 34 is arranged for storing one or more camera specific reference color histograms. A camera specific reference color histogram is a combination of a number of object color histograms determined by a specific video camera 10*a*, 10*b*, 10*c*. Hence, the camera specific reference color histograms are based on the histograms of the objects processed by a specific video camera 10*a*, 10*b*, 10*c*. The camera specific reference color histograms are normally updated, by means of the color histogram updater 40, for new detected object as being detected from a sequence of images from the specific video camera 10*a*, 10*b*, 10*c*. The camera specific reference color histogram will thus be typical for a specific video camera's video camera settings/properties and/or lighting conditions of the monitored scene.

As mentioned above, according to another embodiment, the camera specific reference color histogram is also object type specific. Hence, every specific video camera may have a number of camera specific reference color histograms adapted for, for example different object types, the time of the day or other external factors. Accordingly, by determining different camera specific reference color histograms for different type of objects the statistical variation of colors for a specific type of object is accounted for.

As also mentioned above, according to yet another embodiment, the camera specific reference color histogram is also dependent upon external factors, such as the time of the day. For example, a first camera specific reference color histogram may be used during daytime, a second camera specific reference color histogram may be used during nighttime and a third camera specific reference color histogram may be used during dusk and dawn. According to another example, a first camera specific reference color histogram may be used during opening hours for a store or supermarket and a second camera specific reference color histogram may be used during closing hours of the store or supermarket. Hence, every specific video camera may have a number of camera specific and external factor specific reference color histograms. Accordingly, by determining different camera specific reference color histograms for different external factors the statistical variation of colors during a time when an external factor is fulfilled is accounted for.

The color histogram updater 40 is arranged for updating, using the object color histogram determined by the color histogram producer 38, a camera specific reference color histogram stored in the first memory 34. Depending on the complexity of the object detection technique used various methods for updating the camera specific reference histogram may be used. For example according to one implementation of the present invention each object occurrence corresponds to one YCb and one YCr histogram. For each newly determined object color histogram, the camera specific reference color histograms (one for YCb and one for YCr) is updated with the values of the newly determined object color histogram by applying the moving average method on each bin.

The second memory 36 is arranged for storing a system reference color histogram. The system reference color histogram is a global color reference for the whole system. The system reference color histogram may be generated by a master video camera, i.e. one of the video cameras in the system of video cameras. Alternatively, the system reference color histogram may be generated by using input from a number of video cameras in the system of video cameras. According to an embodiment of the present invention there is a system reference color histogram for each type of object.

The first and second memories 34, 36 may be implemented in a common memory.

The compensation coefficient producer 42 is arranged for determining one or more camera specific color histogram compensation coefficients using a camera specific reference color histogram stored in the first memory 34 and a system reference color histogram stored in the second memory 36. According to an embodiment as discussed above, the camera specific reference histogram is represented by one YCb and one YCr histogram. According to this embodiment, also the system reference color histogram is represented by one YCb and one YCr histogram. Each of the YCb and the YCr histograms (both for the camera specific reference histogram and for the system reference color histogram) can be represented by a single normal distribution. For both the YCb camera specific reference histogram and the YCr camera specific reference histogram as well as for both the YCr system reference color histogram and the YCr system reference color histogram, mean and variance may be calculated and used for comparisons between them. Doing so one or more camera specific color histogram compensation coefficients may be determined by calculating quotas of the mean and variance between the camera specific reference color histogram and the system reference color histogram. It is realized that one could easily add complexity to the model by for example introducing an offset variable in the reference histograms or by representing the histograms by more complex distributions than single normal distributions.

Figure 2:
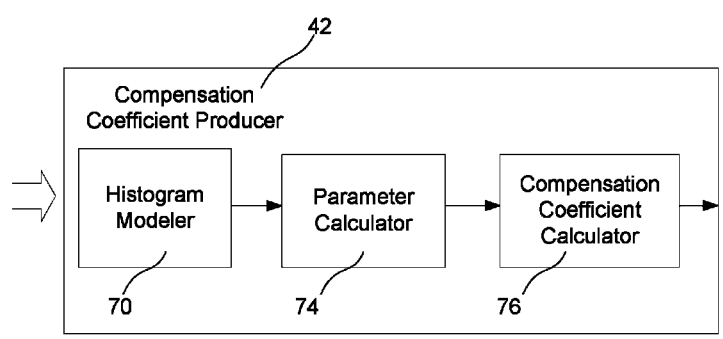
FIG. 2 shows a block diagram of a compensation coefficient producer.

According to an embodiment, the compensation coefficient producer 42 comprises: a histogram modeler 70, a parameter calculator 74 and a compensation coefficient calculator 76. This embodiment of the compensation coefficient producer 42 is illustrated in FIG. 2.

The histogram modeler 70 is arranged for modeling a color histogram with a number of distributions. By doing so, the amount of data may be decreased. According to one embodiment normal distributions are used. The parameter calculator 74 is arranged for calculating parameters of the number of distributions, such as the mean and variance values for the distributions. Moreover, the parameter calculator 74 is arranged for calculating these parameters for both the camera specific reference color histogram as well as for the system reference color histogram. The compensation coefficient calculator 76 is arranged for calculating one or more compensation coefficients using the calculated parameters of the number of distributions as being calculated for both the camera specific reference color histogram as well as for the system reference color histogram.

In the system illustrated in FIG. 1*a*, the object detection unit 30, the object type determination unit 32, the first memory 34, the second memory 36, the color histogram producer 38, the color histogram updater 40, and the compensation coefficient producer 42 are illustrated as separate units wherein each separate unit is connected to the communication network 20. It is however realized that two or more of the object detection unit 30, the object type determination unit 32, the first memory 34, the second memory 36, the color histogram producer 38, the color histogram updater 40, and/or the compensation coefficient producer 42 may be implemented in a combined unit having the combined properties of the separate units 30, 32, 34, 36, 38, 40, 42.

Particularly, according to one embodiment of the present invention, illustrated in FIG. 1*b*, the object detection unit 30, the object type determination unit 32, the first memory 34, the second memory 36, the color histogram producer 38, the color histogram updater 40, and the compensation coefficient producer 42 are comprised in a color balance synchronization apparatus 50. The color balance synchronization apparatus 50 is connected to the same communication network 20 as the video cameras 10*a*, 10*b*, 10*c*.

According to another embodiment of the present invention, illustrated in FIG. 1*c*, each of the video cameras 10*a*, 10*b*, 10*c* comprises a color balance synchronization apparatus 50*a*, 50*b*, 50*c*. Each color balance synchronization apparatus 50*a*, 50*b*, 50*c* comprises an object detection unit 30, an object type determination unit 32, a first memory 34, a second memory 36, a color histogram producer 38, a color histogram updater 40, and a compensation coefficient producer 42.

According to another embodiment, some of the video cameras are provided with a color balance synchronization apparatus 50 and some of the video cameras are not provided with a color balance synchronization apparatus 50. Then input data is communicated from the video cameras without a color balance synchronization apparatus 50 to the video cameras having a color balance synchronization apparatus 50. An alternative in this case would be to also have a color balance synchronization apparatus 50 connected to the communication network 20, in which case input data may be communicated from the video cameras without a color balance synchronization apparatus 50 to the color balance synchronization apparatus 50 connected to the communication network 20.

Figure 3:
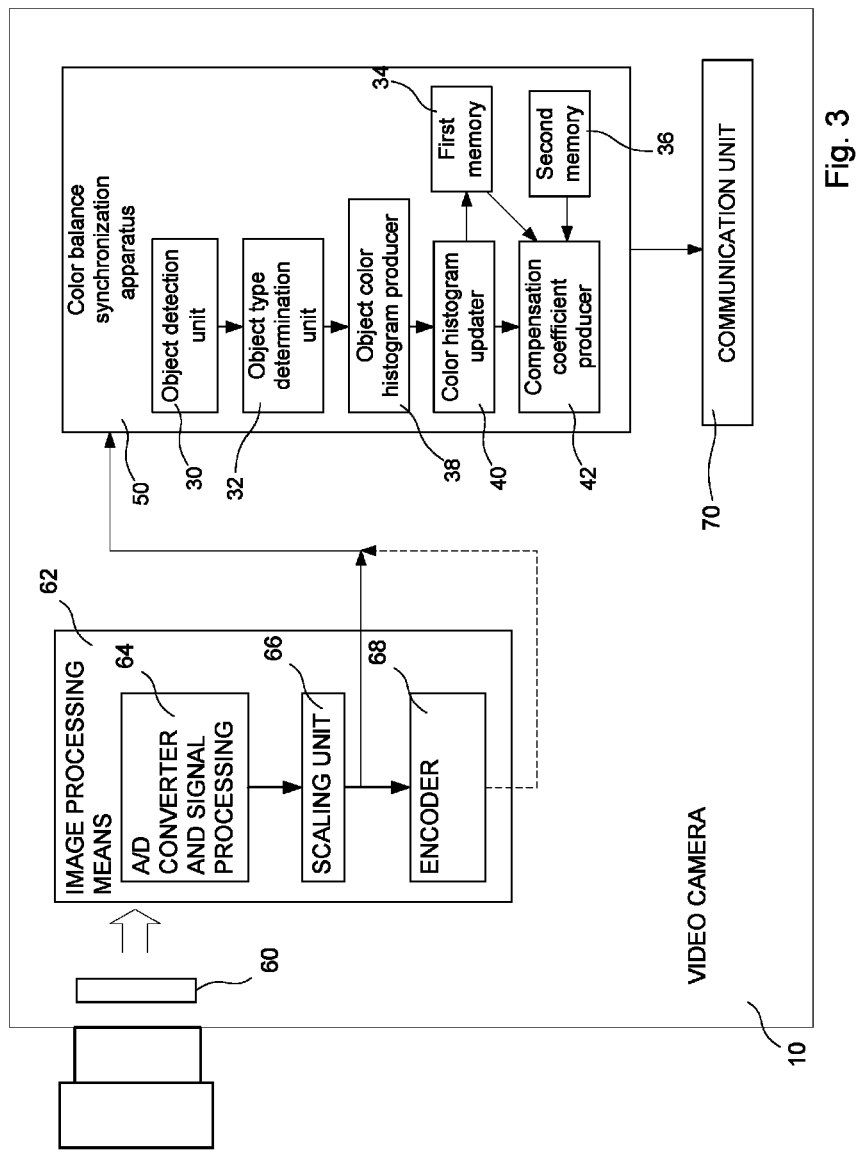
FIG. 3 illustrates a block diagram of a video camera comprising a color balance synchronization apparatus.

In FIG. 3, a video camera 10 comprising a color balance synchronization apparatus 50 according to an embodiment is schematically described. The video camera 10 of FIG. 3 may be for example a video monitoring camera. Standard features of a video camera not being relevant to the embodiments described herein are not included in the following description. The video camera 10 includes an image sensor 60, e.g. a Charge Coupled Device (CCD), a CMOS-sensor or similar, for registering incident light, an image processing means 62, a communication unit 70 for communicating information via the communication network to other video cameras, apparatuses and/or units connected to the communication network 20, and a color balance synchronization apparatus 50 according to an embodiment of the invention.

The image processing means 62 receives information regarding the registered light and processes this information by means of an A/D-converter and signal processing means 64, which is well known by the skilled person. In some embodiments, e.g. when the image sensor 60 is a CMOS-sensor, the image sensor 60 includes A/D-converters and therefore there is no need for any A/D-converters in the image processing means 62. The result from the A/D-converter and signal processing means 64 is digital image data that, according to one embodiment, is processed in a scaling unit 66 and an encoder 68 before the digital image data is sent to the color balance synchronization apparatus 50. The scaling unit 66 is arranged to process the digital image data into at least one image of a particular size. However, it may be arranged to generate a plurality of images of different sizes, all representing the same image/frame provided by the A/D converter and the signal processing means 64. According to another embodiment, the function of the scaling unit is performed by the encoder and in yet another embodiment there is no need to perform any scaling or resizing of the image from the image sensor.

The encoder 68, which is optional for executing the invention, is arranged to encode the digital image data into any one of a plurality of known formats for continuous video sequences, for limited video sequences, for still images or for streamed images/video. For instance, the image information may be encoded into MPEG1, MPEG2, MPEG4, JPEG, MJPG, Bitmapped, etc. The color balance synchronization apparatus 50 may use non-coded images as input data. In that case, image data is taken from the signal processing means 64 or from the scaling unit 66 to the color balance synchronization apparatus 50, without passing the image data through the encoder 68. The non-coded images may be in any non-coded image format, such as BMP, PPM, PGM, PNM, and PBM, although, the color balance synchronization apparatus 50 may also use encoded data as input data.

In an embodiment of the invention, the image data may be sent directly from the signal processing means 64 to the color balance synchronization apparatus 50, without passing the scaling unit 66 or the encoder 68. In yet another embodiment, the image data may be sent to the color balance synchronization apparatus 50 from the scaling unit 66 without passing the encoder 58.

The color balance synchronization apparatus 50 of FIG. 3 is a color balance synchronization apparatus 50 according to an embodiment of the present invention.

Figure 4:
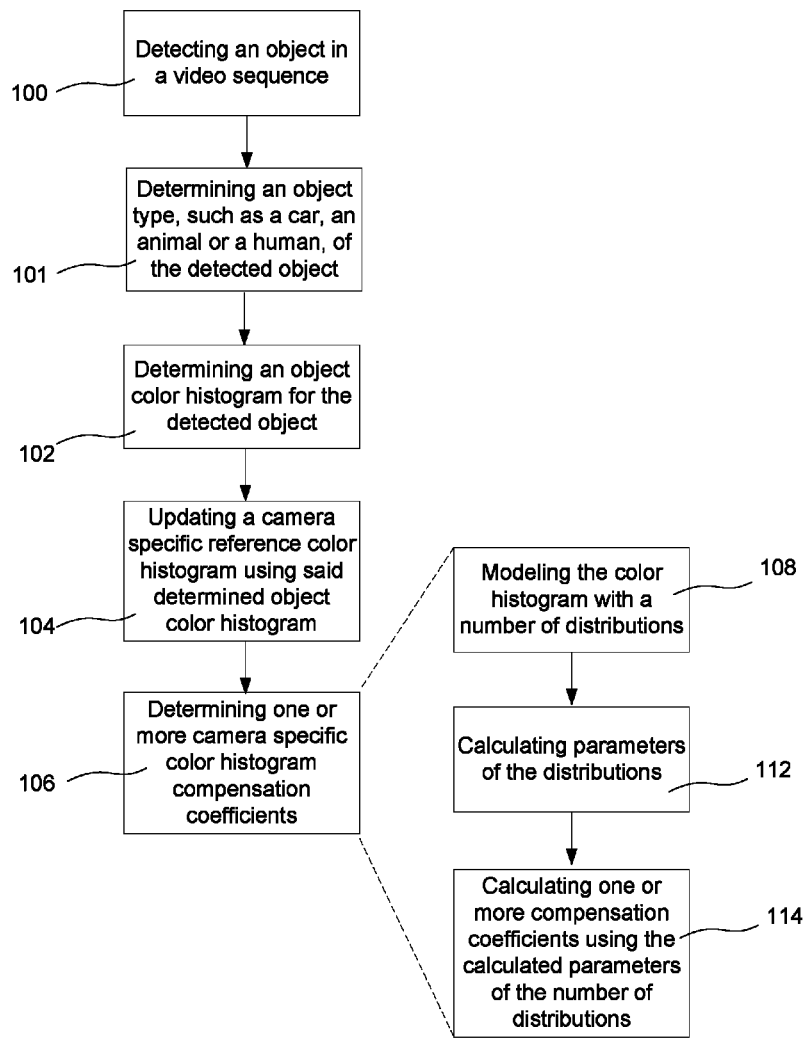
FIG. 4 shows a flow chart of an embodiment of a method for facilitating color balance synchronization between a plurality of video cameras within a system of video cameras.

FIG. 4 illustrates an embodiment of a method for facilitating color balance synchronization between a plurality of video cameras within a system of video cameras according to an embodiment of the invention. The method comprises the following steps (the steps do not necessary need to be executed in the order as they are listed below):

Detecting 100 an object in a video sequence captured by a video camera in the system; determining 102 an object color histogram for the detected object; updating 104 a camera specific reference color histogram using the determined object color histogram; determining 106 one or more camera specific color histogram compensation coefficients by comparing the camera specific reference color histogram with a system reference color histogram. The camera specific reference color histogram and the system reference color histogram are defined above.

According to an embodiment, the method further comprises determining 101 an object type, such as a car, an animal or a human, of the detected object, wherein each object type has a specific camera specific reference color histogram and wherein each object type has a specific system reference color histogram.

According to embodiments, the step 106 of determining one or more camera specific color histogram compensation coefficients by comparing the camera specific reference color histogram with a system reference color histogram further comprises one or more of the following steps: modeling 108 the camera specific reference color histogram and the system reference color histogram with a number of normal distributions with a number of distributions, such as normal distributions; calculating 112 parameters of the distributions, such as the mean and variance values for the distributions; calculating 114 one or more compensation coefficients using the calculated parameters of the number of distributions as being calculated for both the camera specific reference color histogram as well as for the system reference color histogram.

Object Tracking

According to one aspect of the present invention, the color balance synchronization between a plurality of video cameras within a system of video cameras may be used for tracking an object between the plurality of video cameras. Embodiments of systems of video cameras being arranged for tracking an object between the plurality of video cameras is illustrated in FIGS. 5a, 5b.

According to an embodiment, the video monitoring system comprises a first video camera being arranged to monitor a first area and a second video camera being arranged to monitor a second area, wherein the first and second areas does not overlap.

Figure 5A:
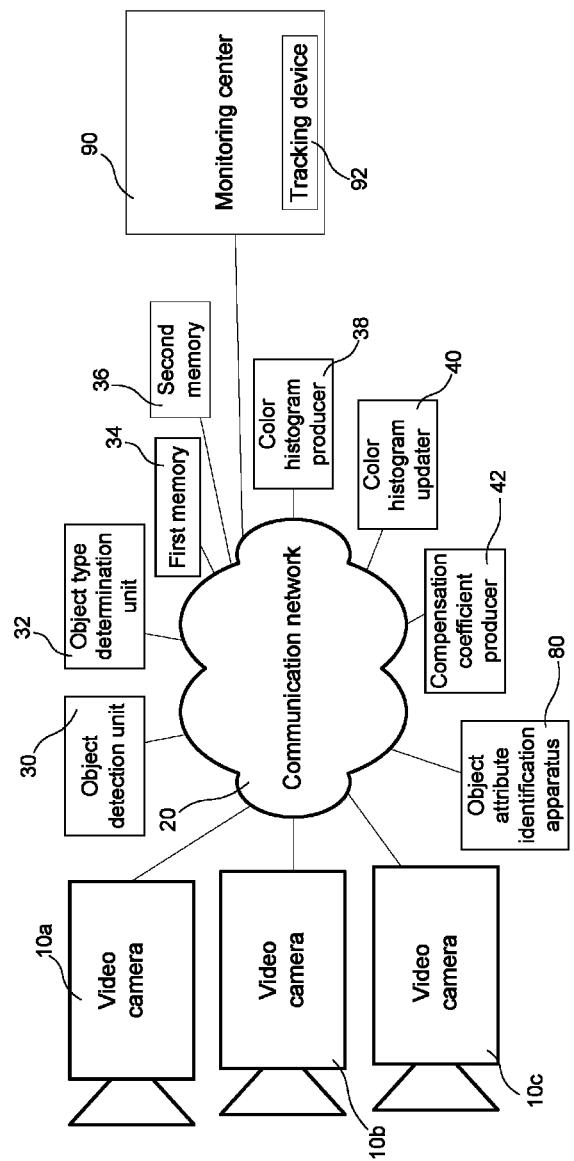
FIG. 5a schematically illustrates an embodiment of a system of video cameras being arranged for tracking an object between the plurality of video cameras.
Figure 5B:
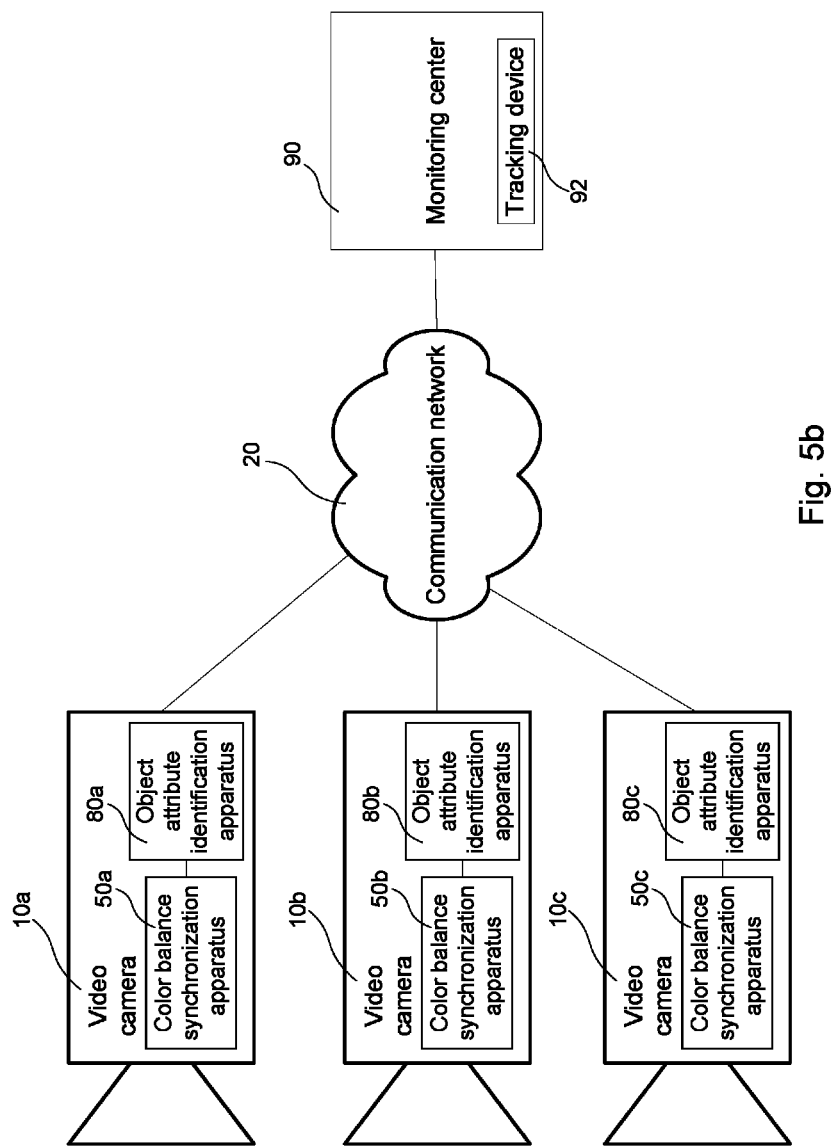
FIG. 5b schematically illustrates another embodiment of a system of video cameras being arranged for tracking an object between the plurality of video cameras.

The system described in FIG. 5a is a development of the system of FIG. 1a. In addition to the system of FIG. 1a, the system of FIG. 5a also comprises an object attribute identification apparatus 80 and a monitoring center 90. The object attribute identification apparatus 80 is arranged for identifying attributes of an object in a video sequence captured by a video camera 10a, 10b, 10c of the system. After identifying attributes of an object, the object attribute identification apparatus 80 is arranged to communicate the identified attributes to a node in the network, such as the monitoring center 90.

The object attribute identification apparatus 80 is arranged for identifying attributes of the object based on the object color histogram generated by the color histogram producer 38.

Figure 6:
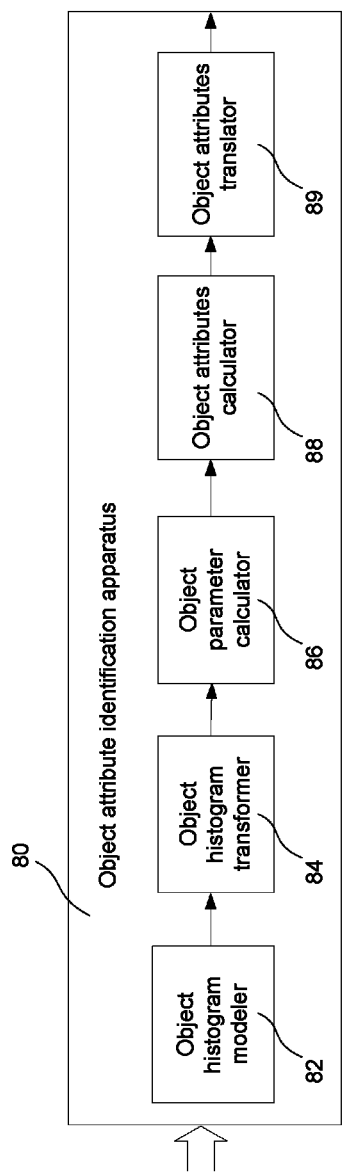
FIG. 6 shows a block diagram of an object attribute identification apparatus.

According to an embodiment of the invention, see FIG. 6, the object attribute identification apparatus 80 comprises: an object histogram modeler 82, an object histogram transformer 84, an object parameter calculator 86, an object attributes calculator 88 and an object attributes translator 89.

The object histogram modeler 82 is arranged for modeling the generated object color histogram with a number of distributions, in one embodiment with normal distributions. By modeling the generated object color histogram with a number of distributions, the amount of data may be decreased. The object histogram transformer 84 is arranged for transforming the color histogram from a Cartesian coordinate system into a polar coordinate system. Thereby, it is facilitated to separate properties of the object in the color histogram from properties of the color histogram depending on the environment. The object parameter calculator 86 is arranged for calculating parameters of the number of distributions, such as the mean and variance of the distributions, which parameters are indicative for identifying properties of the object. The object attributes calculator 88 is arranged for calculating attributes of the object based on the calculated parameters, by weighting the parameters depending on each parameter's significance for identifying properties of the object. Each parameter's significance may be tested for example in advance in a testing step. The object attributes translator 89 is arranged for translating the attributes of the object by using the one or more camera specific color histogram compensation coefficients. Thus, the object attributes translator 89 is arranged for translating the attributes of the object into attributes that can be used and compared globally in the system. The output attributes from the attributes translator 89 are independent upon the video camera settings/properties of the video camera used to capture the video sequence from which the object was detected and independent upon the illumination of the scene.

According to an embodiment, mean and variance of the distributions being used to model the object color histogram is translated to a global system space. Accordingly, identification of object properties may be performed using a histogram representation that is independent of the video camera that captured the images.

According to an embodiment, information originating from a plurality of images of a video sequence is used when generating the object color histogram. By using information originating from a plurality of images of a video sequence when generating the color histogram, the object attributes identification apparatus 80 becomes insensitive to temporal and spatial aspects, i.e. when and where in the picture the object was detected, compared to if information from only one image was used. The more images that are used, the more robust the identification apparatus is to temporal and spatial aspects. This means that the object attributes identification apparatus 80 of the invention can identify properties of an object with a high certainty, since the apparatus has a low sensitivity to changes in the appearance of the object in different video sequences.

According to an embodiment, the attributes of an object can be identified in different steps. For example, first the attributes may be identified based on color and intensity information in a small number of images of a video sequence, (e.g., 5 images). Thereafter, a refined identification of the attributes of the object may be accomplished based on a larger amount of images of the video sequence, for example in a later stage when the object has been seen in a larger number of images in the video sequence.

The monitoring center 90 is provided with a tracking device 92, for tracking an object in the video monitoring system based on identified attributes of the object to track received from a first video camera and on identified properties of a candidate object received from a second video camera. The tracking device is arranged such that the identified attributes of the object to track is compared to the identified attributes of the candidate object to calculate whether the candidate object is identical to the object to track.

Figure 7:
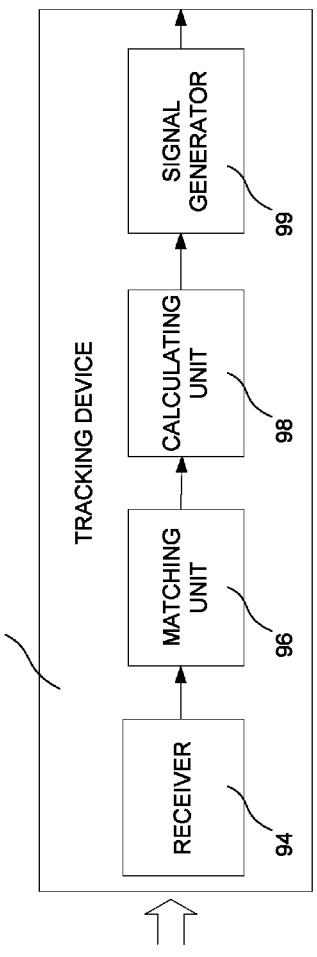
FIG. 7 shows a block diagram of a tracking device.

FIG. 7 illustrates a tracking device 92 according an embodiment. The tracking device 92 comprises a receiver 94, a matching unit 96, a calculating unit 98 and a signal generator 99. The receiver 94 is arranged for receiving attributes regarding a first detected object from the object attribute identification apparatus 80 (i.e. attributes regarding the object to track). The receiver is also arranged for receiving attributes from a second detected object from the object attribute identification apparatus 80 (i.e. attributes regarding a candidate object). The matching unit 96 is arranged for matching the attributes of the candidate object with the attributes of the object to track. The calculation unit 98 is arranged for calculating, based on the matching step, the likelihood of the candidate object being identical to the object to track. The result of the calculation may then be sent as a signal to a presentation unit, such as a display in a monitoring center for being presented on the display to indicate to a person working at the monitoring center that a match/non-match has been found. The result of the calculation may be a probability value indicating the probability of the candidate object being identical to the object to track. The signal generator 99 is arranged to generate such a signal based on the result of the calculation.

In the system illustrated in FIG. 5a, the object detection unit 30, the object type determination unit 32, the first memory 34, the second memory 36, the color histogram producer 38, the color histogram updater 40, the compensation coefficient producer 42 and the object attribute identification apparatus 80 are illustrated as separate units wherein each separate unit is connected to the communication network 20. It is however realized that two or more of the object detection unit 30, the object type determination unit 32, the first memory 34, the second memory 36, the color histogram producer 38, the color histogram updater 40, the compensation coefficient producer 42 and/or the object attribute identification apparatus 80 may be implemented in a combined unit having the combined properties of the separate units 30, 32, 34, 36, 38, 40, 42, 80.

Particularly, according to one embodiment of the present invention, illustrated in FIG. 5b, each of the video cameras 10a, 10b, 10c comprises a color balance synchronization apparatus 50a, 50b, 50c according an embodiment, as well as an object attribute identification apparatus 80a, 80b, 80c.

According to another embodiment, some of the video cameras are provided with an object attribute identification apparatus 80 and some of the video cameras are not provided with an object attribute identification apparatus 80. Then input data is communicated from the video cameras without an object attribute identification apparatus 80 to the video cameras having an object attribute identification apparatus 80. An alternative in this case would be to also have an object attribute identification apparatus 80 in a central node, such as the monitoring center 90, or to have an object attribute identification apparatus 80 connected to the communication network 20. For the case when the central node, such as the monitoring center 90 comprises an object attribute identification apparatus 80 input data may be communicated from the video cameras without an object attribute identification apparatus 80 to the object attribute identification apparatus 80 in the central node. For the case when an object attribute identification apparatus 80 is connected to the communication network 20 input data may be communicated from the video cameras without an object attribute identification apparatus 80 to the object attribute identification apparatus 80 being connected to the communication network 20.

According to yet another embodiment, at least one of the video cameras in the video monitoring system may be provided with a tracking device 92.

Also, the tracking device 92 may receive information regarding attributes of a candidate object from the same video camera as it has received attributes of an object to track. In that case, the attributes of the object to track originates from a first video sequence and the attributes of the candidate object originates from a second video sequence separate from the first video sequence.

Figure 8:
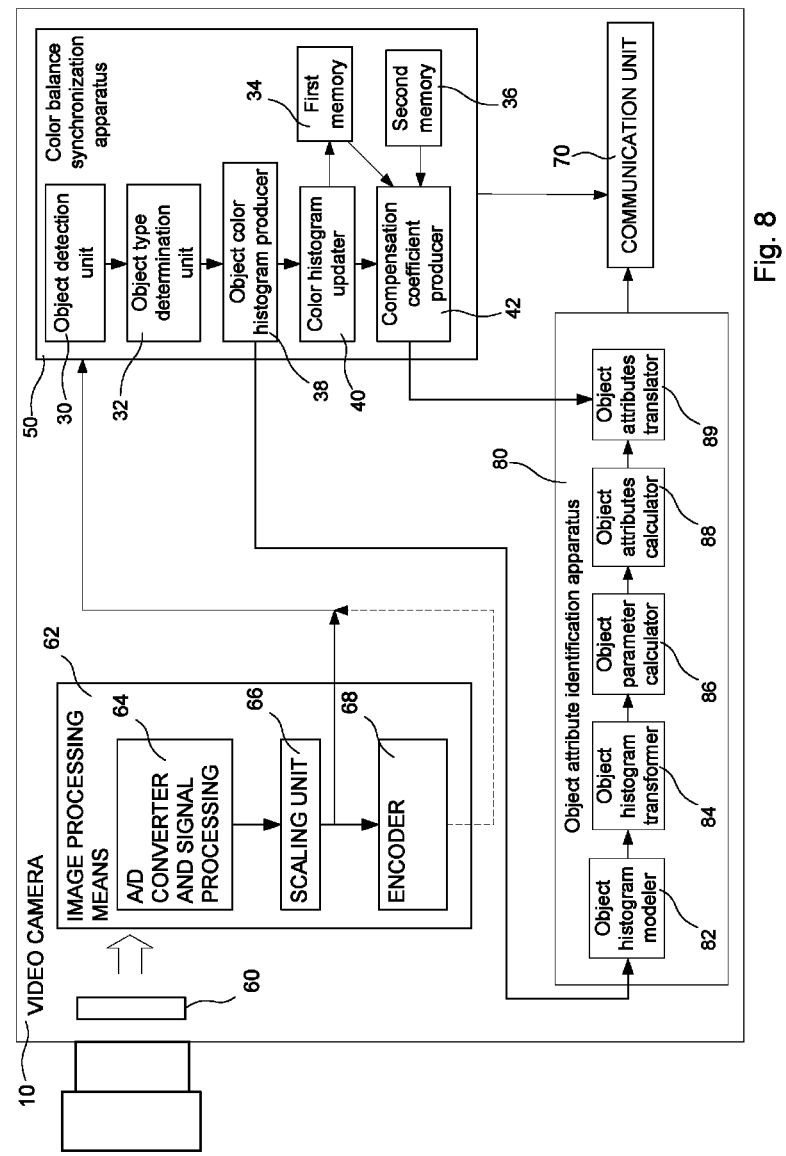
FIG. 8 illustrates a block diagram of a video camera comprising a color balance synchronization apparatus and an object attribute identification apparatus.

In FIG. 8, a video camera 10 according on embodiment of the present invention is illustrated. The video camera 10 of FIG. 8 resembles in much the video camera 10 of FIG. 3. In addition, as compared to the video camera of FIG. 3, the video camera of FIG. 8 also comprises an object attribute identification apparatus 80 according to the invention.

The communication unit 70 of the video camera 10 is arranged, amongst other, to communicate information regarding the attributes of the object identified from the color histogram by the object attribute identification apparatus 80 in the video camera 10 to a tracking device 92 arranged in another node in the communication network, or alternatively arranged in the same video camera.

Figure 9:
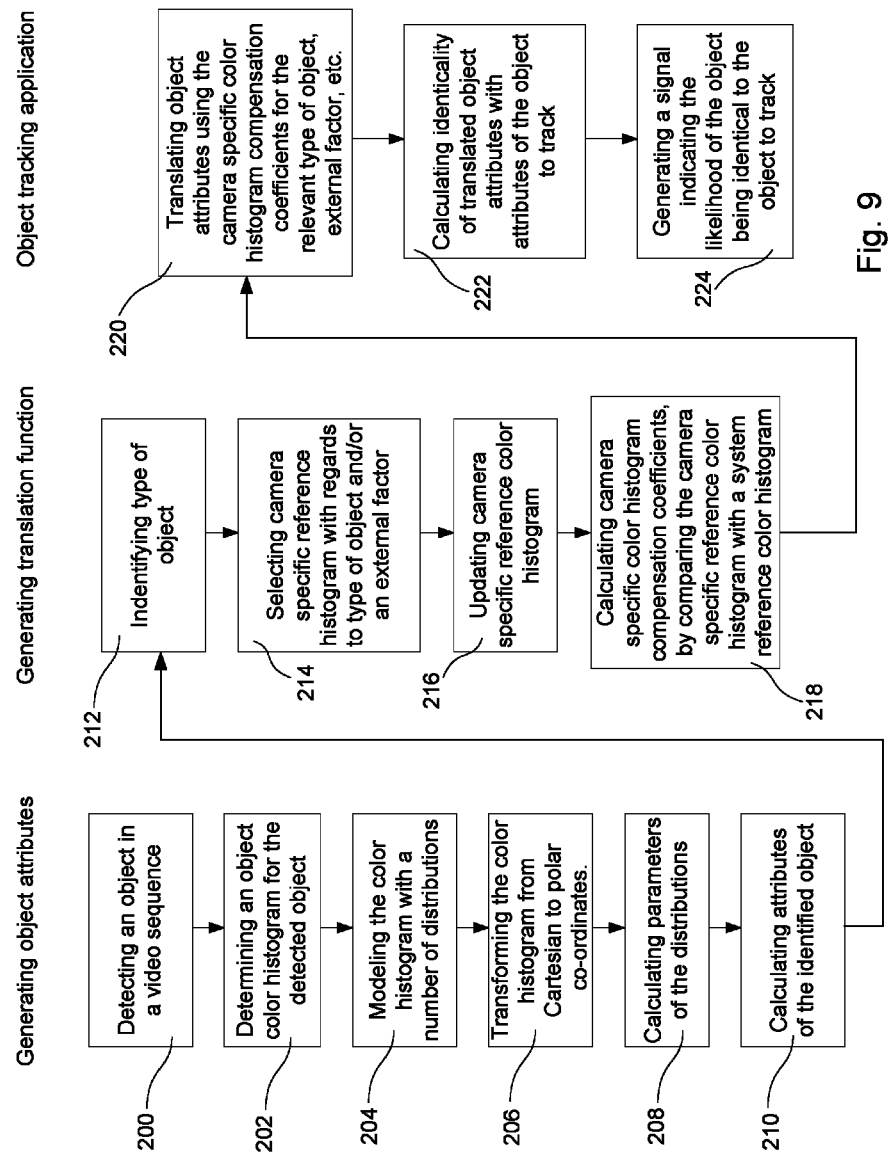
FIG. 9 shows a flow chart of an embodiment of a method for tracking an object in a video monitoring system.

FIG. 9 illustrates a method for tracking an object in a video monitoring system according to an embodiment. The video monitoring system comprises a number of video cameras. The method comprises the following steps: detecting 200 an object in a video sequence captured by a video camera; determining 202 an object color histogram based on color and/or intensity information of the object from a plurality of images in the video sequence; modeling 204 the object color histogram with a number of distributions, such as normal distributions; transforming 206 the color histogram from a Cartesian co-ordinate system into a polar co-ordinate system; calculating 208 parameters of the distributions, such as mean and variance values, which parameters are used for identifying attributes of the object; calculating 210 attributes of the object based on the calculated parameters of the object, for example by weighting the parameters of the distributions depending on each parameter's correlation with the attributes of the object; determining 212 the type of object using any method known by the skilled person, some of such methods being listed below; selecting 214 which camera specific reference histogram to use with regards to type of object and/or an external factor, such as time of day, if store is opened or closed. etc; updating 216 the camera specific reference color histogram using the determined object color histogram; calculating 218 camera specific color histogram compensation coefficients, by comparing the camera specific reference color histogram with a system reference color histogram; translating 220 object attributes of the detected object using the camera specific color histogram compensation coefficients for the relevant type of object, external factor, etc; calculating 222 the likelihood of the translated object attributes being identical to the attributes of the object to track; generating 224 a signal indicating the likelihood of the object being identical to the object to track.

The steps listed above do not necessarily need to be performed in the listed order. For example the step 204 of modeling and the step 206 of transforming are made in any mutual order.

According to an embodiment of the invention, the method further comprises the step of normalizing color and intensity information of the object in each image by the number of pixels the object is described in each image. The step of normalizing may take place either before or after the step 202 of determining the object color histogram.

In an embodiment of the invention, the step 208 of calculating parameters of the distributions comprises: transforming the object color histogram from the polar coordinate system to a second Cartesian coordinate system; moving the origin of the coordinates to the centre of mass of the object in the object color histogram; calculating the position of the number of distributions in the second Cartesian coordinate system, wherein the position of the number of distributions in the second Cartesian coordinate system is used as a parameter for identifying properties of the object.

The step 208 of calculating parameters of the distributions may further comprise: identifying a center of mass of the object color histogram and a object color histogram distribution; and calculating parameters for identifying properties of the object based on the identified centre of mass and the identified object color histogram distribution. In this case the term "color histogram distribution" should be interpreted as an extension in the color histogram of a cluster of blobs that describes the object. The histogram can be described as comprising a number of blobs, wherein each blob is defined as a one-color object portion and wherein the object is described as a cluster of such one-color object portions.

Figure 10:
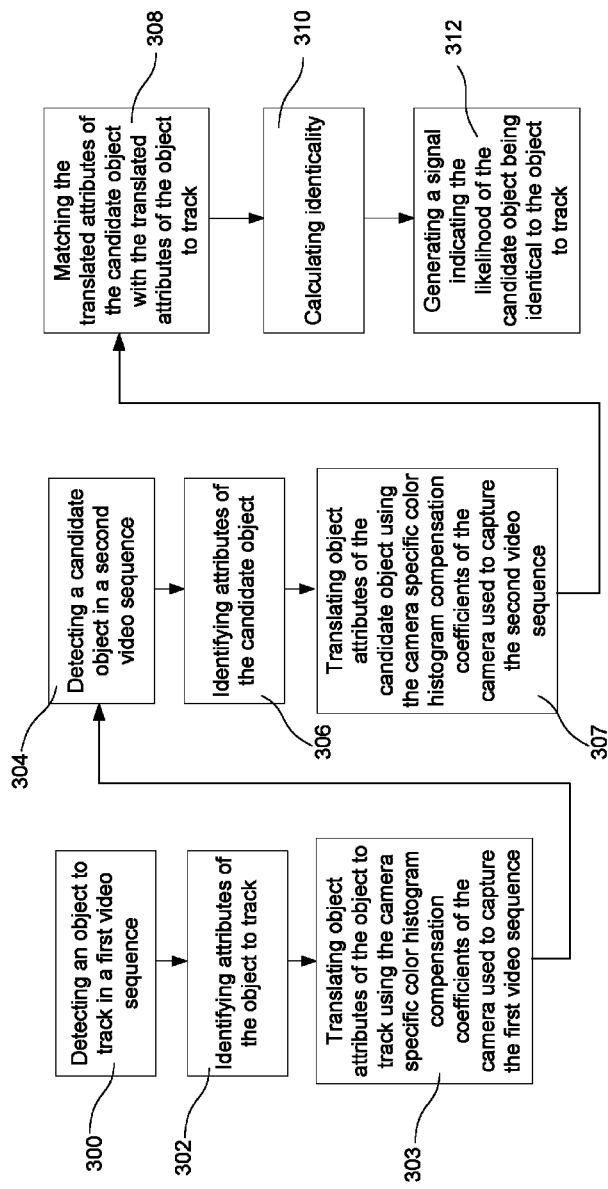
FIG. 10 shows a flow chart explaining in greater detail the part of the method of FIG. 9 wherein the actual object tracking is made.

FIG. 10 illustrates in greater detail the part of the method of FIG. 9 wherein the actual object tracking is made. The method comprises: detecting 300 an object to track in a first video sequence captured by a first video camera; identifying 302 attributes of the object to track in accordance with what is discussed above; translating 303 the object attributes of the object to track using the camera specific color histogram compensation coefficients of the first video camera; detecting 304 a candidate object in a second video sequence captured by a second video camera; identifying 306 attributes of the candidate object in accordance with what is discussed above; translating 307 object attributes of the candidate object using the camera specific color histogram compensation coefficients of the second video camera; matching 308 the attributes of the candidate object with the attributes of the object to track; calculating 310, based on the matching step, the likelihood of the candidate object being identical to the object to track; and generating 312 a signal indicating the likelihood of the candidate object being identical to the object to track.

The generated signal may be presented (e.g., visually at a screen of an operator in the monitoring center). The operator can then use this information to further check visually in the two video sequences whether a match between a candidate object and an object to track really exists.

In an alternative embodiment of the invention, the first video camera and the second video camera may be the same video camera, in which case the first and the second video sequences are separate video sequences captured by the same video camera.

The video camera or cameras and/or other nodes in the video monitoring system may have a computer arranged to receive a computer usable medium on which a computer program product is stored. The computer program product comprises computer readable program means for causing the computer to perform the steps of any of the methods described above.

Object Detection and Object Type Detection

Methods for detecting an object by means of a video camera is typically based on analyzing motion or visual features in the video camera view.

Parts of the video camera view that are moving in video sequences may be regarded as an object in motion. The parts of the video camera view that are moving may also be further analyzed and grouped into different objects, two objects being very close may also be treated as a single object.

Being able to detect one or more moving objects in a video sequence is one of the main building blocks in the field of video analytics. There are several methods for determining what is moving in a scene. One such method is based on making a model of the scene's background. The background of the scene monitored by the video camera is here defined as the part of the scene that is constant, i.e. the part of the scene that does not change with time. The basic idea for detecting movement in the scene is to compare each pixel in a new image of the video sequence with the corresponding pixel in the background model to detect changes. This method may be referred to as change detection, foreground/background segmentation or background subtraction.

The change detection may be performed by comparing each pixel in a new image of the video sequence with the corresponding pixel of the background model. If the difference between the background model and the new image is greater than a threshold value, the pixel in the new image is regarded as a pixel that has changed. The result is a Boolean motion map where each pixel $m_{i,j}$ is represented by:

$$m_{i,j} = \begin{cases} 1 & \text{if } |s_{i,j} - r_{i,j}| \geq t \\ 0 & \text{otherwise} \end{cases} \qquad \text{Equation 1}$$

where $r_{i,j}$ is the pixel value of the background model, $s_{i,j}$ is the pixel value of the current image of the video sequence and t is the threshold value.

The background model needs to be constantly updated to take into account for example gradual changes in the background which do not refer to motion. The update of the background model is performed by adapting the background model to the new image frames of the video sequence. This can be done by a simple temporal IIR (Infinite Impulse Response) filter:

$$r_{i,j} = (1-\alpha)r_{i,j} + \alpha s_{i,j} \qquad \text{Equation 2}$$

where $r_{i,j}$ is the update factor in the range [0,1].

There are also more sophisticated algorithms for modeling and updating the background. One way is to represent a background pixel by a Gaussian distribution, with a mean and a variance value. Stauffer and Grimson model the background using several Gaussian distributions per pixel (see C. Stauffer and W. E. L. Grimson, *Adaptive background mixture models for real-time tracking*, Proceedings of the IEEE Conference on Computer Vision and Pattern Recognition (CVPR), p. 246-252, 1999). Each distribution is weighted according to the variance value and how often it is observed. A pixel that does not fit into a background model with large enough weight is considered to be a foreground pixel. This algorithm is also known as Gaussian mixture model.

Examples of other methods of video motion detection include analyzing spatio-temporal changes in an image volume of a video sequence as described in US 2010/0080477.

Combination of different motion detection methods known in the art may also be used to improve the resulting motion detection and hence also the object detection. Motion detection based object detection may detect any type of object as long as it is or has been moving.

An alternative group of methods for detecting objects are based on analyzing visual features in the video camera view. Different types of methods for pattern or feature detection may for example be used for object detection. The method described in U.S. Pat. No. 7,099,510 is an example of this where classifiers are used to detect features of an object in a cascade-based architecture using a search window scanning the images in a video sequence. Another process for detection or evaluation using search windows is for example presented by Schneiderman and Kanade (see A Statistical Method for 3D Object Detection Applied to Faces and Cars", by Henry Schneiderman and Takeo Kanade at Robotics Institute, Carnegie MellonUniversity, Pittsburgh, Pa. 15213, http://www.cs.cmu.edu/afs/cs.cmu.edu/user/hws/www/CVPR00.pdf).

When analyzing visual features instead of motion it does not matter if the objects that are to be detected are in motion or stationary in the video camera view. This type of object detection is, however, sensitive to detection mistakes due to changes in the view that affect the visual features of the objects to be detected, like for example the video camera's viewing angles of the objects, lighting of the scene, color representations of the image sensor, etc.

By analyzing visual features in the video camera view, predefined types of objects may be detected or recognized. Predefined types of objects that are detected may be for example cars, faces, people, people wearing a special uniform or type of clothing, different sorts of animals, bicycles or other types of vehicles, i.e. any type of object that may be distinguished from other objects using visual features.

Combinations of the methods described above and other types of similar methods may also be used to improve the detection or recognition of objects or object types.

When it comes to determining specific object types, the easiest and least complicated method is just to assume that all objects that have been detected correspond to a certain object type. One could also use other situation specific parameters of the detected object to determine if the detected object corresponds to a certain object type.

Objects that move with a velocity above a specific threshold may be used for example as well as the aspect ratio of the detected object. Vehicles could be defined for example as detected objects that move with at least a specific velocity. Alternatively, or in combination, vehicles could be detected as objects with an aspect ratio that indicates that the width of the object is larger than the height (which would be the opposite for humans).

In the drawings and specification, there have been disclosed embodiments and examples of the invention and, although specific terms are employed, they are used in a generic and descriptive sense only and not for the purpose of limitation.

What is claimed is:

1. A method for facilitating color balance synchronization between a plurality of video cameras within a system of video cameras, comprising:
   detecting an object in a video sequence captured by a specific video camera in the system of video cameras;
   determining an object color histogram for the detected object;
   updating a camera specific reference color histogram for the specific video camera using the determined object color histogram;
   determining the relative color balance for the specific video camera as one or more camera specific color histogram compensation coefficients by comparing the camera specific reference color histogram for the specific video camera with a system reference color histogram being a global color reference for the whole system of video cameras; and
   translating the object color histogram into a camera independent object color histogram by applying the camera specific color histogram compensation coefficients to the object color histogram.

2. The method according to claim 1, further comprising determining an object type of the detected object, wherein each object type has a specific camera specific reference color histogram and wherein each object type has a specific system reference color histogram.

3. The method according to claim 1, wherein the system reference color histogram is based on a camera specific reference color histogram of one of the plurality of video cameras.

4. The method according to claim 1, wherein the system reference color histogram is based on a combination of at least two camera specific reference color histograms.

5. The method according to claim 1, wherein the camera specific reference color histogram and the system reference color histogram are dependent upon an external factor.

6. The method according to claim 1, wherein color histogram is interpreted as a color histogram belonging to any one of the following group of color histograms: a YCbCr color histogram, a YCb color histogram combined with a YCr color histogram, a RGB color histogram, a CMYK color histogram, a grey scale histogram, an intensity histogram or an IR histogram, or any combination thereof.

7. A system for facilitating color balance synchronization between a plurality of video cameras, comprising:
   a video camera;
   an object detection unit being arranged to detect an object in a video sequence captured by the video camera;
   a first memory for storing a camera specific reference color histogram of the video camera;
   a second memory for storing a system reference color histogram being a global color reference for the plurality of video cameras;
   an object color histogram producer being arranged to determine an object color histogram for the object detected by the object detection unit;
   a color histogram updater for updating, using the object color histogram determined by the color histogram producer, the camera specific reference color histogram stored in the first memory;
   a compensation coefficient producer for determining the relative color balance for the video camera as one or more camera specific color histogram compensation coefficients using the camera specific reference color histogram and the system reference color histogram stored in the second memory; and
   an object attribute identification apparatus for translating the object color histogram into a camera independent object color histogram by applying the camera specific color histogram compensation coefficients to the object color histogram.

8. The system according to claim 7, wherein the video camera is arranged to monitor a first area and wherein the system further comprises a second video camera being arranged to monitor a second area, wherein the first and second areas do not overlap.

9. The system according to claim 7, further comprising an object type determination unit being arranged to determine the object type of the detected object, wherein each object type has a specific camera specific reference color histogram and wherein each object type has a specific system reference color histogram.

10. The system according to claim 7, wherein the object attribute identification apparatus being arranged for identifying attributes of the object using the color histogram for the detected object and the camera specific color histogram compensation coefficients.

11. A video camera being connectable to a network of video cameras for facilitating color balance synchronization between a plurality of video cameras the video camera comprising:
   an object detection unit being arranged to detect an object in a video sequence captured by the video camera;
   a first memory for storing a camera specific reference color histogram of the video camera;
   a second memory for storing a system reference color histogram being a global color reference for the plurality of video cameras;
   an object color histogram producer being arranged to determine an object color histogram for the object detected by the object detection unit;
   a color histogram updater for updating, using the object color histogram determined by the object color histogram producer, the camera specific reference color histogram stored in the first memory;

a compensation coefficient producer for determining the relative color balance for the video camera as a camera specific color histogram compensation coefficient using the camera specific reference color histogram and the system reference color histogram stored in the second memory; and an object attribute identification apparatus for translating the object color histogram into a camera independent object color histogram by applying the camera specific color histogram compensation coefficients to the object color histogram.

12. The video camera according to claim 11, further comprising an object type determination unit being arranged to determine the object type of the detected object, wherein each object type has a specific camera specific reference color histogram and wherein each object type has a specific system reference color histogram.

13. The video camera according to claim 11, wherein the object attribute identification apparatus being arranged for identifying attributes of the object using the color histogram for the detected object and the camera specific color histogram compensation coefficients.

14. A non-transitory computer-readable recording medium having recorded thereon a program, that when executed on a device having processing capabilities, implements the following steps:

detecting an object in a video sequence captured by a specific video camera in the system of video cameras;

determining an object color histogram for the detected object;

updating a camera specific reference color histogram for the specific video camera using the determined object color histogram;

determining the relative color balance for the specific video camera as one or more camera specific color histogram compensation coefficients by comparing the camera specific reference color histogram for the specific video camera with a system reference color histogram being a global color reference for the whole system of video cameras; and translating the object color histogram into a camera independent object color histogram by applying the camera specific color histogram compensation coefficients to the object color histogram.

* * * * *